United States Patent
Luo et al.

(12)

(10) Patent No.: US 12,444,950 B2
(45) Date of Patent: Oct. 14, 2025

(54) CONTROL METHOD AND APPARATUS FOR SHUT-OFF DEVICE AND SHUT-OFF DEVICE

(71) Applicant: ALTENERGY POWER SYSTEM INC., Zhejiang (CN)

(72) Inventors: Yuhao Luo, Zhejiang (CN); Dongming Zhou, Zhejiang (CN); Fei Shen, Zhejiang (CN); Xuan Zhu, Zhejiang (CN); Xiao Lu, Zhejiang (CN); Guowei Miao, Zhejiang (CN); Wenwei Li, Zhejiang (CN)

(73) Assignee: ALTENERGY POWER SYSTEM INC., Zhejiang (CN)

( * ) Notice: Subject to any disclaimer, the term of this patent is extended or adjusted under 35 U.S.C. 154(b) by 176 days.

(21) Appl. No.: 18/568,820

(22) PCT Filed: Jul. 8, 2021

(86) PCT No.: PCT/CN2021/105162
§ 371 (c)(1),
(2) Date: Dec. 10, 2023

(87) PCT Pub. No.: WO2022/257214
PCT Pub. Date: Dec. 15, 2022

(65) Prior Publication Data
US 2024/0275172 A1  Aug. 15, 2024

(30) Foreign Application Priority Data
Jun. 11, 2021 (CN) .......................... 202110656872.3

(51) Int. Cl.
*G06F 1/26* (2006.01)
*H02J 3/00* (2006.01)
(Continued)

(52) U.S. Cl.
CPC ................ *H02J 3/38* (2013.01); *H02J 3/001* (2020.01); *H02J 3/007* (2020.01); *G06F 1/3203* (2013.01); *H02J 2300/24* (2020.01)

(58) Field of Classification Search
CPC .... H02J 3/38; H02J 3/001; H02J 3/007; H02J 2300/24; H02J 3/381; Y02E 10/56
(Continued)

(56) References Cited

U.S. PATENT DOCUMENTS 12,281,919 B2 * 4/2025 Adest ...................... H02J 3/381
12,281,937 B1 * 4/2025 Matsunaga ............... G01J 1/44
(Continued)

FOREIGN PATENT DOCUMENTS

| CN | 106602504 A | 4/2017 |
|---|---|---|
| CN | 207543025 U | 6/2018 |

(Continued)

OTHER PUBLICATIONS

International Search Report for PCT/CN2021/105162 mailed Mar. 9, 2022, ISA/CN.
(Continued)

*Primary Examiner* — Volvick Derose
(74) *Attorney, Agent, or Firm* — Yue (Robert) Xu; Apex Attorneys at Law, LLP

(57) ABSTRACT

A method and an apparatus for controlling a shutoff device, and a shutoff device. The method is applied to a processor of the shutoff device. The method includes: determining whether a heartbeat signal is received continuously during a first preset period; if so, controlling the N main switching transistors to be turned on, and determining whether the heartbeat signal is not received continuously during a second preset period; and if so, controlling the N main switching transistors to be turned off, and controlling the release circuit to be turned on to release a voltage on the bus. A release
(Continued)

circuit is controlled to release voltage on the bus to the ground, thereby rapidly reducing the voltage on the bus, avoiding person danger and safety accidents caused by the long-term presence of the direct current high voltage on the bus, and improving the safety and reliability of a photovoltaic system.

12 Claims, 9 Drawing Sheets

(51) Int. Cl.
  *H02J 3/38* (2006.01)
  *G06F 1/3203* (2019.01)
(58) Field of Classification Search
  USPC .......................................................... 713/300
  See application file for complete search history.

(56) References Cited

U.S. PATENT DOCUMENTS

| | | | | |
|---|---|---|---|---|
| 2018/0062379 | A1* | 3/2018 | Zhu | H02H 1/0061 |
| 2018/0248359 | A1* | 8/2018 | Zou | H02S 40/34 |
| 2020/0007077 | A1* | 1/2020 | Karin | H02M 7/537 |
| 2020/0091706 | A1* | 3/2020 | Yang | H02S 40/36 |
| 2021/0351592 | A1* | 11/2021 | Gu | H02S 40/38 |
| 2021/0391710 | A1* | 12/2021 | Yang | H02J 3/381 |
| 2022/0294389 | A1* | 9/2022 | Luo | H02S 40/34 |
| 2024/0136817 | A1* | 4/2024 | Yang | H02J 3/381 |

FOREIGN PATENT DOCUMENTS

| | | |
|---|---|---|
| CN | 108832893 A | 11/2018 |
| CN | 109088431 A | 12/2018 |
| CN | 110429580 A | 11/2019 |
| CN | 110729964 A | 1/2020 |
| CN | 110855170 A | 2/2020 |
| CN | 111585307 A | 8/2020 |
| CN | 111934352 A | 11/2020 |
| CN | 112751354 A | 5/2021 |
| CN | 112868153 A | 5/2021 |
| CN | 213151926 U | 5/2021 |
| WO | 2021003728 A1 | 1/2021 |

OTHER PUBLICATIONS

The 1st Office Action dated Jul. 26, 2023 for the Chinese Patent Application No. CN202110656872.3.
The 2nd Office Action dated Apr. 17, 2024 for the Chinese Patent Application No. CN202110656872.3.

* cited by examiner

CONTROL METHOD AND APPARATUS FOR SHUT-OFF DEVICE AND SHUT-OFF DEVICE

CROSS REFERENCE OF RELATED APPLICATION

The present application is the national phase of International Application No. PCT/CN2021/105162, titled "CONTROL METHOD AND APPARATUS FOR SHUTDOWN DEVICE, AND SHUTDOWN DEVICE", filed on Jul. 8, 2021, which claims priority to Chinese Patent Application No. 202110656872.3, titled "CONTROL METHOD AND APPARATUS FOR SHUTDOWN DEVICE, AND SHUTDOWN DEVICE", filed on Jun. 11, 2021 with the China National Intellectual Property Administration, both of which are incorporated herein by reference in their entireties.

FIELD

The present disclosure relates to the field of security protection for photovoltaic power generation systems, and in particular to a method and an apparatus for controlling a shutoff device, and a shutoff device.

BACKGROUND

Due to reproducibility and cleanliness of solar energy, a technology of grid-connected photovoltaic power generation has been rapidly developed. In general, a photovoltaic system includes multiple photovoltaic module groups connected in series, and the photovoltaic module groups connected in series are connected to an inverter through a direct current cable, to enable the inverter to convert a direct current high voltage output from the multiple photovoltaic module groups into an alternating current high voltage for integration into a power grid. Each photovoltaic module group includes N photovoltaic modules, N is a positive integer, and N photovoltaic modules are connected in series with each other.

In conventional technology, in order to ensure security of power supply of the photovoltaic system, an arc protection function is generally provided in the inverter. Specifically, the inverter is controlled to stop operating when an arc is detected. However, a direct current cable connected to an output terminal of multiple photovoltaic module groups still output a direct current high voltage, which may cause personal danger or fire accident.

To solve the above technical problems, in conventional technology, a shutdown device is provided in an output terminal of each photovoltaic module group. The shutdown devices are connected in series to realize series connection of the photovoltaic module groups. When an arc appears, each shutdown device is controlled to be turned off, to avoid direct current high voltage output from the direct current bus, thereby avoiding personal danger or fire accident.

In summary, it is an urgent problem in conventional technology to provide a method for controlling a shutdown device to reliably reduce the direct current high voltage of the direct current bus.

SUMMARY

The purpose of the present disclosure is to provide a method and an apparatus for controlling a shutoff device, and a shutoff device. If a heart signal is not received continuously during a second preset period, N main switching transistors are controlled to be turned off and corresponding N bypass switching transistors are controlled to be turned on to prevent N photovoltaic modules from outputting direct current power to a bus. A release circuit is controlled to release voltage on the bus to the ground, thereby rapidly reducing the voltage on the bus, avoiding person danger and safety accidents caused by the long-term presence of the direct current high voltage on the bus, and improving the safety and reliability of a photovoltaic system.

In order to solve the technical problems above, a method for controlling a shutoff device is provided in the present disclosure. The method is applied to a processor of the shutoff device. The shutoff device includes N main switching transistors corresponding to N photovoltaic modules one by one and a release circuit.

A first terminal of a first main switching transistor is an output positive terminal of the shutdown device, a second terminal of an i-th main switching transistor is connected to an output positive terminal of an i-th photovoltaic module, a first terminal of an (i+1)-th main switching transistor is connected to an output negative terminal of the i-th photovoltaic module, an output negative terminal of a N-th photovoltaic module is an output negative terminal of the shutdown device, a control terminal of the release circuit is connected to a first output terminal of the processor, an input terminal of the release circuit is connected to a bus, and an output terminal of the release circuit is grounded, where $N \geq i \geq 1$, and N and i are both integers The method includes:
determining whether a heartbeat signal is received continuously during a first preset period;
when determining that the heartbeat signal is received continuously during the first preset period, controlling the N main switching transistors to be turned on, and determining whether the heartbeat signal is not received continuously during a second preset period; and
when determining that the heart signal is not received continuously during the second preset period, controlling the N main switching transistors to be turned off, and controlling the release circuit to be turned on to release a voltage on the bus.

In an embodiment, after the controlling the N main switching transistors to be turned off, the method further includes:
obtaining a bus voltage on the bus;
determining whether the bus voltage is greater than a preset voltage; and
when determining that the bus voltage is not greater than the preset voltage, proceeding to the step of controlling the release circuit to be turned on to release the voltage on the bus.

In an embodiment, the release circuit includes a switching circuit. A first terminal of the switching circuit is connected to the bus, a second terminal of the switching circuit is grounded, and a control terminal of the switching circuit is the control terminal of the release circuit. The controlling the release circuit to be turned on to release the voltage on the bus includes:
controlling to conduct the first terminal of the switching circuit and the second terminal of the switching circuit to release the voltage on the bus.

In an embodiment, a positive terminal of a power supply of the processor is connected to an output positive terminal of a first photovoltaic module, and a negative terminal of the power supply of the processor is connected to the output negative terminal of the i-th photovoltaic module.

The shutdown device further includes N bypass switching transistors corresponding to the N photovoltaic modules one by one, a first terminal of each bypass switching transistor is connected to a second terminal of a corresponding main switching transistor, and a second terminal of said bypass switching transistor is connected to an output negative terminal of a corresponding photovoltaic module.

Each of the N bypass switching transistors is a Metal-Oxide-Semiconductor Field-Effect Transistor, MOSFET, and the MOSFET includes a body diode.

After the controlling the N main switching transistors to be turned on, the method further includes:
determining whether a supply voltage of the processor is less than an under-voltage protection voltage;
when determining that the supply voltage is less than the under-voltage protection voltage, controlling the N main switching transistors to be turned off, and determining whether a bypass current of a bypass switching transistor is continuously greater than a preset current during a third preset period; and
controlling the N bypass switching transistors to be turned on when determining that the bypass current is continuously greater than the preset current during the third preset period.

In an embodiment, after the controlling the N bypass switching transistors to be turned on, the method further includes:
determining whether a turning-on period of the N bypass switching transistors reaches a fourth preset period; and
controlling the N bypass switching transistors to be turned off and proceeding to the step of controlling the N main switching transistors to be turned on, when determining that the turning-on period reaches the fourth preset period.

In an embodiment, after the determining whether a supply voltage of the processor is less than an under-voltage protection voltage, the method further includes:
obtaining operating information of the N photovoltaic modules when determining that the supply voltage of the processor is not less than the under-voltage protection voltage;
determining whether there is a photovoltaic module with abnormal operation in the N photovoltaic modules based on the operation information; and
controlling a main switching transistor corresponding to the photovoltaic module with abnormal operation to be turned off and controlling a bypass switching transistor corresponding to the photovoltaic module with abnormal operation to be turned on, when determining that there is the photovoltaic module with abnormal operation.

In an embodiment, the shutdown device further includes a first controllable switch. A control terminal of the first controllable switch is connected to a second output terminal of the processor, a first terminal of the first controllable switch is connected to an output terminal of a power supply of the processor, and a second terminal of the first controllable switch is connected to a low-voltage device of the shutdown device.

After the controlling the N main switching transistors to be turned off, the method further includes:
controlling to conduct the first terminal of the first controllable switch and the second terminal of the first controllable switch, to enable the processor to supply power to the low-voltage device through the first controllable switch.

In an embodiment, each of the N main switching transistors is Metal-Oxide-Semiconductor Field-Effect Transistor, MOSFET, and the MOSFET includes a body diode.

After the controlling the N main switching transistors to be turned on, the method further includes:
obtaining a reverse current of each of the N main switching transistors;
determining whether said reverse current is greater than a preset reverse current; and
when determining that said reverse current is greater than the preset reverse current, controlling a corresponding main switching transistors of which said reverse current is greater than the preset reverse current to be turned on, to backflow said reverse current to a corresponding photovoltaic module through the corresponding main switching transistor.

In order to solve the technical problems above, an apparatus for controlling a shutoff device is further provided in the present disclosure. The apparatus includes:
a memory, configured to storage computer program;
a processor, configured to implement any one of the above methods for controlling the shutoff device when executes the computer program.

In order to solve the technical problems above, a shutoff device is further provided in the present disclosure. The shutoff device includes: the apparatus for controlling the shutoff device described above; N main switching transistors corresponding to the N photovoltaic modules one by one; and a release circuit.

A first terminal of a first main switching transistor is an output positive terminal of the shutdown device, a second terminal of an i-th main switching transistor is connected to an output positive terminal of an i-th photovoltaic module, a first terminal of an (i+1)-th main switching transistor is connected to an output negative terminal of the i-th photovoltaic module, an output negative terminal of a N-th photovoltaic module is an output negative terminal of the shutdown device, a control terminal of the release circuit is connected to a first output terminal of the processor, an input terminal of the release circuit is connected to a bus, and an output terminal of the release circuit is grounded, where $N \geq i \geq 1$, and N and i are both integers.

The release circuit is configured to release a voltage on the bus after the N main switching transistors are turned off.

In an embodiment, the release circuit includes a second controllable switch and a third controllable switch. A control terminal of the second controllable switch is the control terminal of the release circuit, a first terminal of the second controllable switch is connected to a power supply module, a second terminal of the second controllable switch is connected to a control terminal of the third controllable switch, a first terminal of the third controllable switch is connected to the bus, and a second terminal of the third controllable switch is grounded.

In an embodiment, N is equal to 1, and the release circuit includes a reference voltage module and a fourth controllable switch. An output terminal of the reference voltage module is connected to a control terminal of the fourth controllable switch, a first terminal of the fourth controllable switch is connected to the bus, and a second terminal of the fourth controllable switch is connected to a ground terminal of the processor.

A method and an apparatus for controlling a shutoff device, and a shutoff device are provided in the present disclosure. If a heartbeat signal is received continuously during the first preset period, N main switching transistors are controlled to be turned on, and corresponding N photovoltaic modules output direct current power to a bus, thus, an inverter output alternating current power for integration into a power grid. If the heart signal is not received continuously during a second preset period, the N main switching transistors are controlled to be turned off and the corresponding N bypass switching transistors are controlled to be turned on, to prevent the N photovoltaic modules from outputting direct current power to the bus. A release circuit is controlled to release voltage on the bus to the ground, thereby rapidly reducing the voltage on the bus, avoiding person danger and safety accidents caused by the long-term presence of the direct current high voltage on the bus, and improving the safety and reliability of a photovoltaic system.

BRIEF DESCRIPTION OF THE DRAWINGS

In order to illustrate technical solutions in embodiments of the present disclosure more clearly, drawings to be used in the description of the conventional technology or the embodiments are introduced simply hereinafter. It is apparent that the drawings described below show only some embodiments of the present disclosure, and other drawings may be obtained by those skilled in the art based on the provided drawings without any creative effort.

DETAILED DESCRIPTION OF THE EMBODIMENTS

The core of the present disclosure is to provide a method and an apparatus for controlling a shutoff device, and a shutoff device. If a heart signal is not received continuously during a second preset period, N main switching transistors are controlled to be turned off and corresponding N bypass switching transistors are controlled to be turned on to prevent N photovoltaic modules from outputting direct current power to a bus. A release circuit is controlled to release voltage on the bus to the ground, thereby rapidly reducing the voltage on the bus, avoiding person danger and safety accidents caused by the long-term presence of the direct current high voltage on the bus, and improving the safety and reliability of a photovoltaic system.

In order to clarify the purpose, technical solutions and advantages of the embodiments of the present disclosure, the technical solutions in the embodiments of the present disclosure are described clearly and completely hereinafter in conjunction with the drawings in the embodiments of the present disclosure. Apparently, the described embodiments are only a part of the embodiments of the present disclosure, rather than all embodiments. Any other embodiments obtained by those skilled in the art based on the embodiments in the present disclosure without any creative effort shall fall within the protection scope of the present disclosure.

Figure 1:
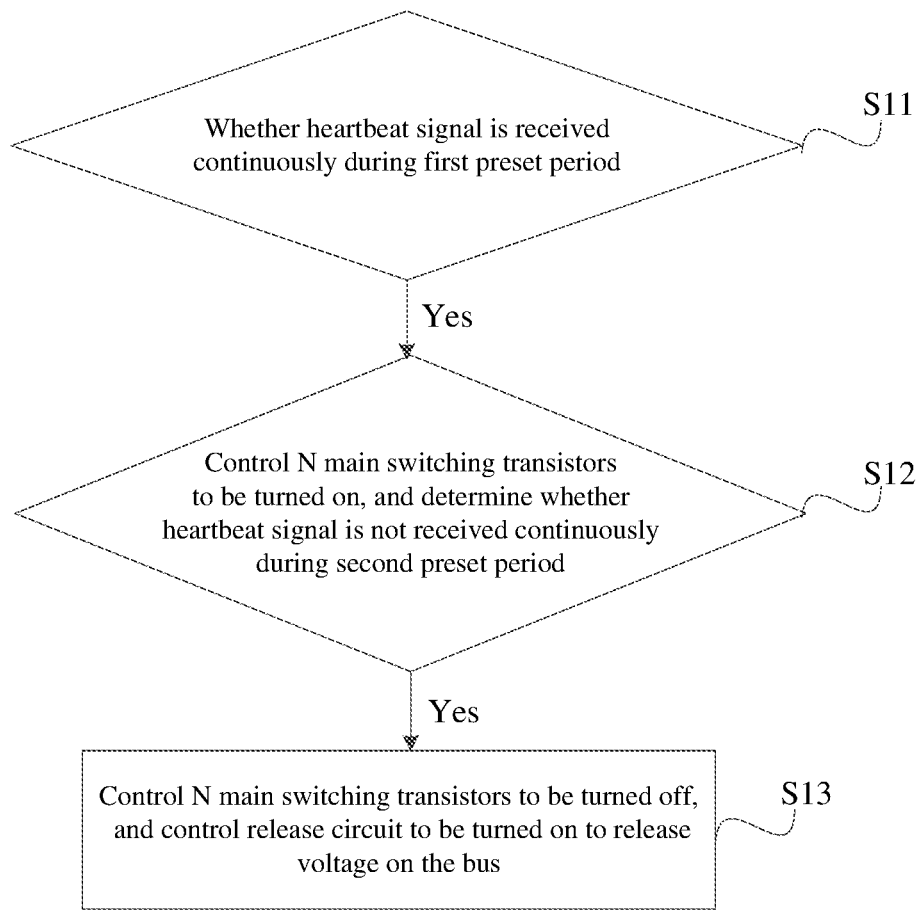
FIG. 1 is a schematic flowchart of a method for controlling a shutoff device according to an embodiment of the present disclosure.

Reference is made to FIG. 1, which shows a schematic flowchart of a method for controlling a shutoff device according to an embodiment of the present disclosure. The control method is applied to a processor of the shutdown device. The shutdown device includes: N photovoltaic modules corresponding to N main switching transistors one by one, and a release circuit.

A first terminal of a first main switching transistor is an output positive terminal of the shutdown device. A second terminal of an i-th main switching transistor is connected to an output positive terminal of an i-th photovoltaic module. A first terminal of an (i+1)-th main switching transistor is connected to an output negative terminal of the i-th photovoltaic module. An output negative terminal of a N-th photovoltaic module is an output negative terminal of the shutdown device. A control terminal of the release circuit is connected to a first output terminal of the processor, an input terminal of the release circuit is connected to a bus, and an output terminal of the release circuit is grounded. Where N≥i≥1, and N and i are both integers.

The control method includes:

S11: determining whether a heartbeat signal is received continuously during a first preset period;

S12: if the heartbeat signal is received continuously during the first preset period, controlling the N main switching transistors to be turned on, and determining whether the heartbeat signal is not received continuously during a second preset period; and S13: if the heart signal is not received continuously during the second preset period, controlling the N main switching transistors to be turned off, and controlling the release circuit to be turned on to release a voltage on the bus.

Considering the presence of the bus capacitor on the direct current bus, even if the shutdown devices are controlled to be turned off to avoid outputting direct current high voltage on the DC bus, due to the fact that the bus capacitor can store energy after the shutdown devices are turned off, there may still be direct current high voltage on the DC bus, which may cause personal danger or fire accidents.

In order to solve the technical problems above, the design concept of the present disclosure is to: control the voltage on the direct current bus to drop rapidly after controlling the shutdown device to be turned off, so as to accelerate the speed of voltage drop on the direct current bus, thereby avoiding the continuous high voltage on the bus and reducing the possibility of personal danger or fire accidents Based on the above, a release circuit is provided in the shutdown device according to embodiments of the present disclosure. One terminal of the release circuit is connected to the bus, and the other terminal of the release circuit is grounded. After each shutdown device is turned off, the voltage on the bus is released to the ground by controlling the release circuit to conduct. Specifically, the conduction of the release circuit must occur when the photovoltaic module outputs direct current power to the bus and when the shutdown devices are turned off. Therefore, the control method in the present disclosure is as follows: the system controller sends the heartbeat signal continuously during the first preset period, the N main switching transistors are turned on, and the corresponding N photovoltaic modules output direct current power to the bus by, so as to ensure that the inverter outputs alternating current power for integration into the power grid; the system controller does not send the heartbeat signal continuously during the second preset period, the N main switching transistors are turned off, and the corresponding N bypass switching transistors are turned on, so as to prevent the N photovoltaic modules from outputting direct current power to the bus. The release circuit is controlled to release voltage on the bus to the ground, thereby rapidly reducing the voltage on the bus, avoiding person danger and safety accidents.

The first preset period and the second preset period provided in the control method according to the present disclosure are used to guarantee the stability of the received heartbeat signal. The heartbeat signal could but is not limited to be sent by the system controller. The system controller may send the heartbeat signal to the processor based on user instructions or other methods to enable the photovoltaic system to start working normally. That is to say, due to possible interference or other factors, the system controller may mistakenly send or fail to send the heartbeat signal in a short period of time. In this case, if the N main switching transistors or the N bypass switching transistors are directly controlled to operate, it may lead to misoperation or frequent action of the switching transistors which may cause damage to the shutdown device. Therefore, the first preset period and the second preset period are provided in the present disclosure to ensure that the processor receives a stable heartbeat signal or does not receive the heartbeat signal stably, thereby ensuring the reliability of system operation.

Figure 2:
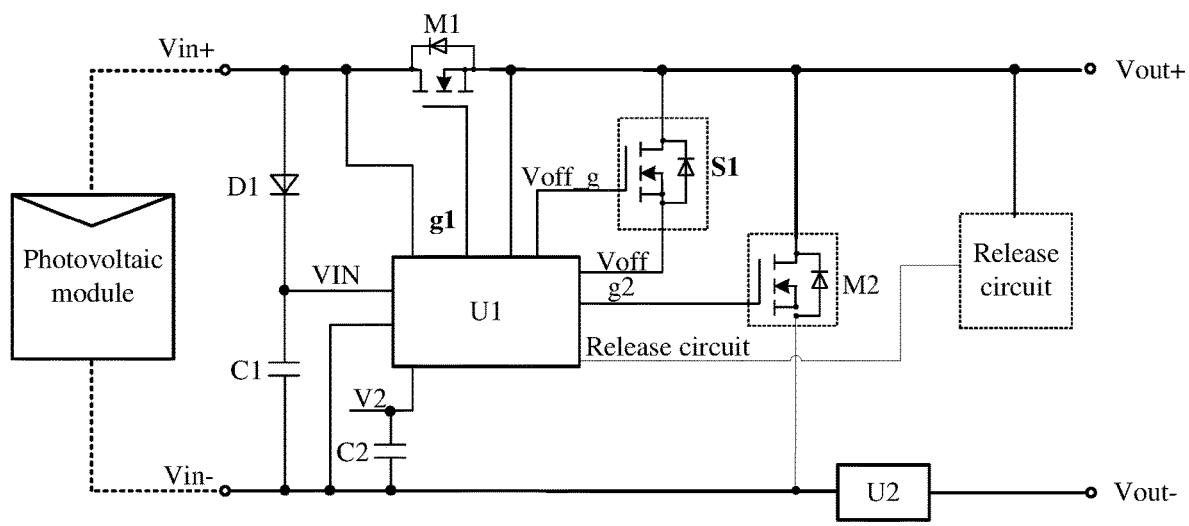
FIG. 2 is a specific implementation circuit diagram of a shutoff device corresponding to one photovoltaic module according to an embodiment of the present disclosure.
Figure 3:
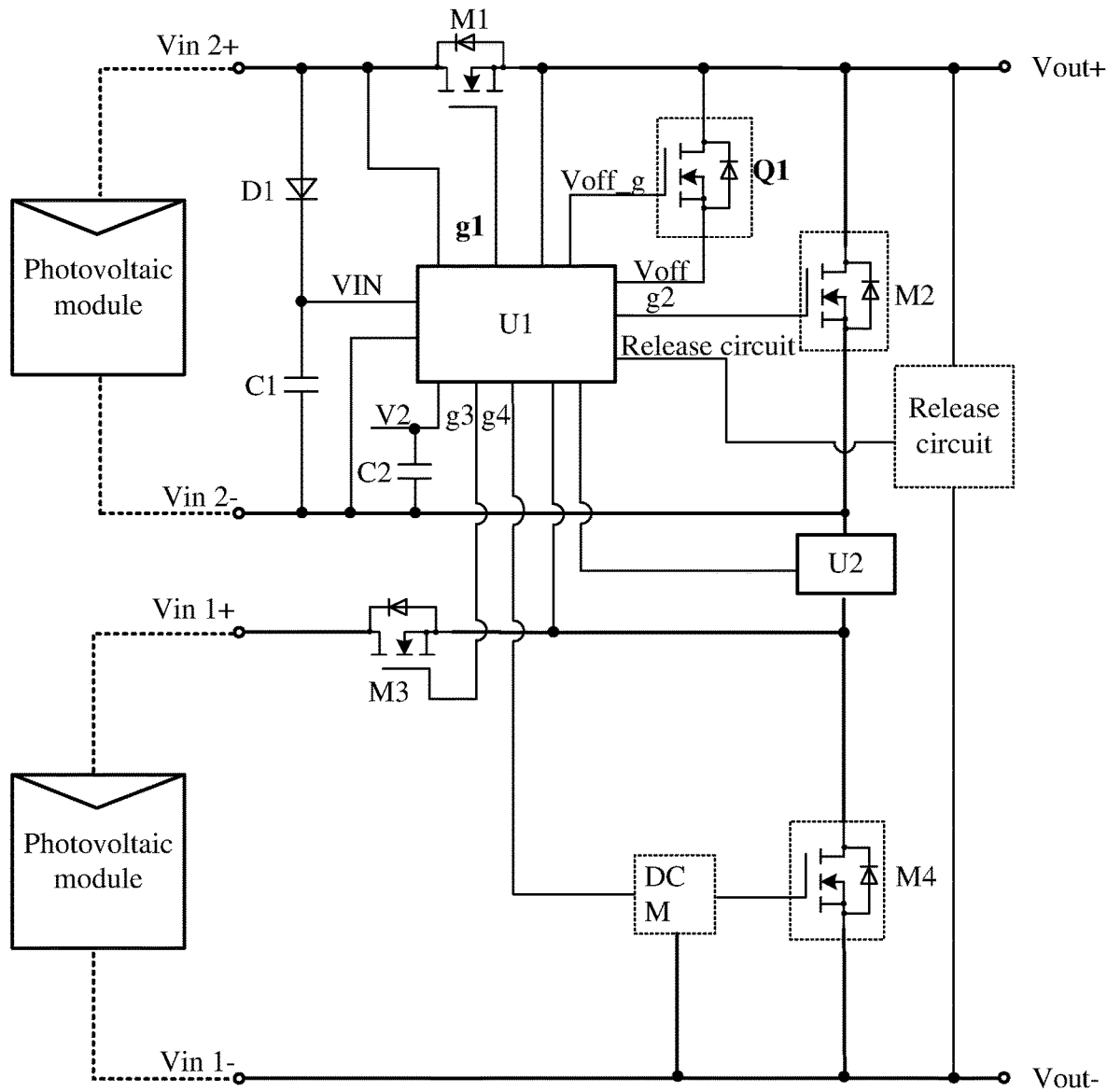
FIG. 3 is a specific implementation circuit diagram of a shutoff device corresponding to two photovoltaic modules according to an embodiment of the present disclosure.
Figure 4:
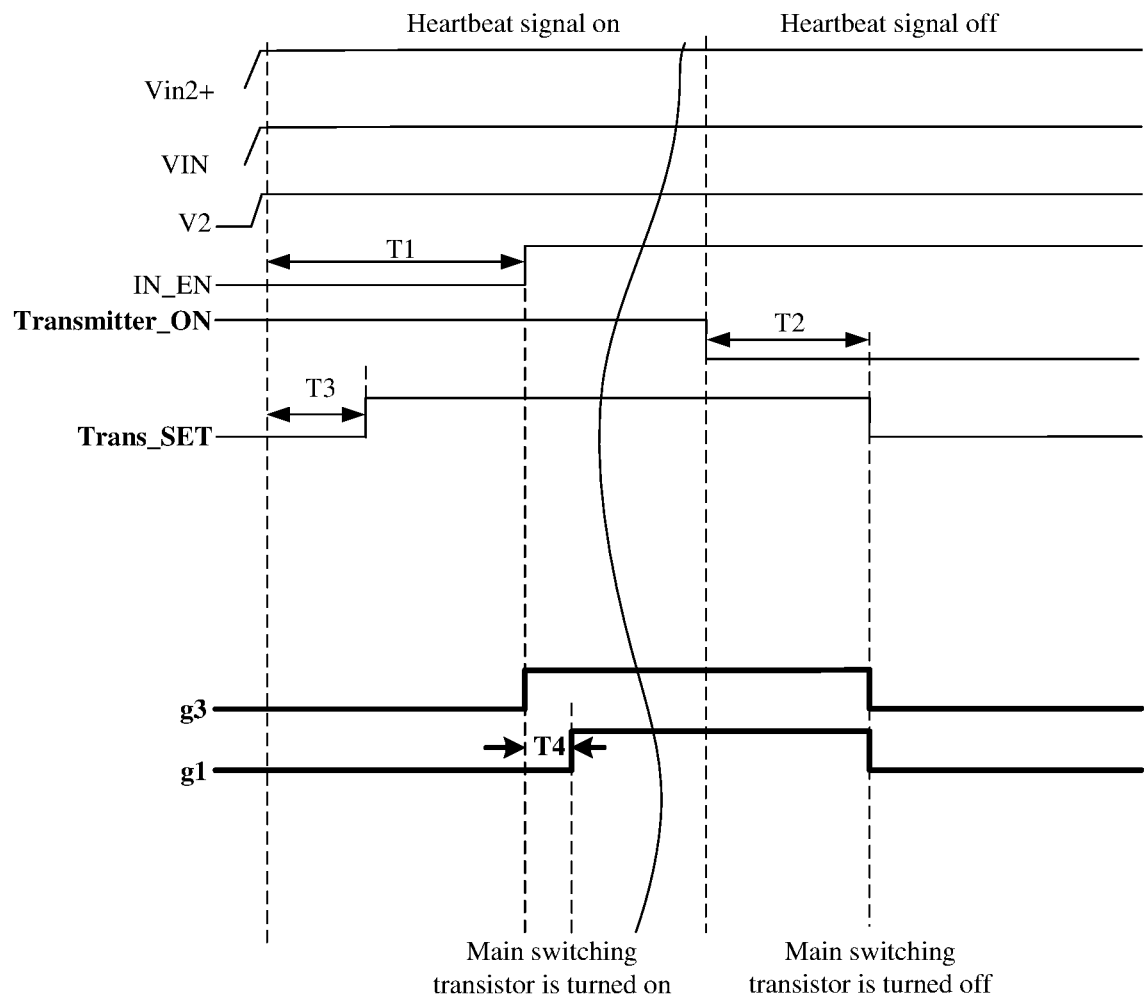
FIG. 4 is a control timing diagram of a shutdown device corresponding to two photovoltaic modules according to an embodiment of the present disclosure.

Reference is made to FIG. 2, FIG. 3 and FIG. 4. FIG. 2 is a specific implementation circuit diagram of a shutoff device corresponding to two photovoltaic modules according to an embodiment of the present disclosure. FIG. 3 is a specific implementation circuit diagram of a shutoff device corresponding to one photovoltaic module according to an embodiment of the present disclosure. FIG. 4 is a control timing diagram of a shutdown device corresponding to two photovoltaic modules according to an embodiment of the present disclosure.

For the convenience of description, the following embodiments are illustrated by a shutdown device corresponding to two photovoltaic modules.

In an embodiment, the shutdown device also includes a diode D1, a first capacitor C1 and a second capacitor C2.

An anode of the diode D1 is connected to the output positive terminal of the first photovoltaic module, a cathode of the diode D1 is connected to a first terminal of the first capacitor C1 and the positive terminal of the power supply of the processor respectively, a second terminal of the first capacitor C1 is connected to an output negative terminal of the first photovoltaic module and a first terminal of the second capacitor C2 respectively, a second terminal of the second capacitor C2 is connected to the output terminal of the power supply of the processor and a terminal of a power supply of an electrical apparatus in the shutoff device respectively.

The processor further configured to convert a voltage of the positive terminal of the power supply of the processor to supply power to the electrical apparatus in the shutoff device.

Specifically, the output voltage of the photovoltaic module charges the first capacitor C1 through the diode D1, and the voltage of the first capacitor C1 is the power supply voltage of the processor. Similarly, the power supply at the output terminal of the power supply of the processor supplies power to the second capacitor C2, and the first terminal voltage of the second capacitor C2 may supply power to other electrical apparatus.

In addition, when the photovoltaic module does not output voltage, due to the energy storage capacity of the capacitor itself, even if the photovoltaic module does not output voltage, the first capacitor C1 can still supply power to the processor for a period of time, to prevent the processor from being powered off. Similarly, the second capacitor C2 can also ensure that the powered electrical equipment operates normally for a period of time.

In general, the processor is configured to buck its power supply voltage to supply power to low-voltage devices. Therefore, the corresponding capacitor C1 is a capacitor with a large capacitance, a relatively large packaging volume and a high cost. For example, the first terminal voltage of the first capacitor C1 is about one hundred volts. A capacitance, a corresponding packaging volume and a cost of the second capacitor C2 are relatively small. For example, the first terminal voltage of the second capacitor C2 is about 20 volts. When the photovoltaic module does not output voltage, the power supply of the second capacitor C2 mainly comes from the first capacitor C1, which means that the capacitance stored in the first capacitor C1 not only supplies power to the processor, but also supplies power to the electrical apparatus connected to the output terminal of the power supply of the processor. Accordingly, the capacitance of the second capacitor C2 can be adaptively increased (such as, increasing the the first terminal voltage of the second capacitor C2 to 25 volts), and the capacitance of the first capacitor C1 can be adaptively reduced (such as, reducing the first terminal voltage of the first capacitor C1 to 80 volts). In this way, the second capacitor C2 stores more energy and takes less energy from the first capacitor C1, thus, the capacitance of the first capacitor C1 can be set smaller, which can greatly reduce the packaging volume and cost of the first capacitor C1 and the second capacitor C2.

In addition, based on the above embodiments, the processor in the present disclosure may be one processor or include two separate processors. For example, the processor includes a first processor U1 and a second processor U2, and a number of the photovoltaic modules corresponding to the shutoff device is two. As shown in FIG. 3 and FIG. 4, Vin2+ is the output voltage of the first photovoltaic module, and VIN is the power supply voltage of the processor. Specifically, VIN is the power supply voltage of the first processor U1, that is, the first terminal voltage of the first capacitor C1. V2 is the output power supply voltage of the processor. Specifically, V2 is the power supply voltage of the second processor U2, that is, the first terminal voltage of the second capacitor C2. IN EN is the internal logic signal, Transmitter_ON is the heartbeat signal, and Trans_SET is the start signal sent from the second processor U2 to the first processor after receiving the heart beat signal. Correspondingly, the first processor U1 is specifically configured to: control the two main switching transistors to be turned on after the start signal is received; control the two main switching transistors to be turned off and control the N bypass switching transistors to be turned on when no start signal is received, and control the release circuit to be turned on.

In an embodiment, the controlling N main switching transistors to be turned on includes:

controlling the N main switching transistors to be turned on by staggering peaks.

In FIG. 4, g1 and g3 are control signals of the main switching transistors M1 and M3 respectively, where M1 and M3 are turned on when a corresponding control signal is at a high level. As can be seen from FIG. 4, when the heartbeat signal is sent continuously by the system controller during T3 (the first preset period), a high-level signal is sent from the second processor U2 to the first processor U1, so that the first processor U1 controls M3 to be turned on firstly, and then, after T4 (staggering peak time), the first processor U1 controls M1 to be turned on. Alternatively, the first processor U1 controls M1 to be turned on firstly, and then controls M3 to be turned on after T4, which is not specifically limited in the present disclosure. When the system controller does not send the heartbeat signal continuously during T2 (the second preset period), the second processor U2 sends a low-level signal to the first processor U1 to ensure that the first processor U1 controls M1 and M2 to be turned off.

In summary, in the present disclosure, the N main switching transistors are controlled to be turned off, so as to prevent the N photovoltaic modules from outputting direct current power to the bus. The release circuit is controlled to release voltage on the bus to the ground, thereby rapidly reducing the voltage on the bus, avoiding person danger and safety accidents.

Based on the above embodiments, in an embodiment, after the controlling the N main switching transistors to be turned off, the method further includes:

obtaining a bus voltage on the bus;

determining whether the bus voltage is greater than a preset voltage; and if so, entering the step of controlling the release circuit to be turned on to release the voltage on the bus There may be a direct current capacitor or bus capacitor on the bus. After controlling multiple shutdown devices to be turned off, that is, after controlling the corresponding N main switching transistors to be turned off, the photovoltaic module will not continue to output direct current power to the bus. Nevertheless, due to the presence of the bus capacitor on the bus, high-voltage direct current power is stored in the bus capacitor, if the high-voltage direct current power stored in the bus capacitor is directly released through the release circuit, it may cause excessive voltage input to the release circuit, thereby causing severe heating of the release circuit, which may lead to damage to the release circuit.

In order to solve the above technical problems, in the present disclosure, after the N main switching transistors are controlled to be turned off, it is further determined whether the bus voltage is greater than the preset voltage. In a case that the bus voltage is greater than the preset voltage, it is considered that the release circuit may be broken when the bus voltage is released by the release circuit. In this case, the bus can first consume the bus voltage on its own, or the inverter connected to the bus can consume a portion of the bus voltage. In a case that the bus voltage is not greater than the preset voltage, it is determined that the bus voltage would not threaten the safety of the release circuit. In this case, the release circuit is controlled to be turned on to release the bus voltage to the ground, so as to decrease the voltage on the bus rapidly.

Figure 5:
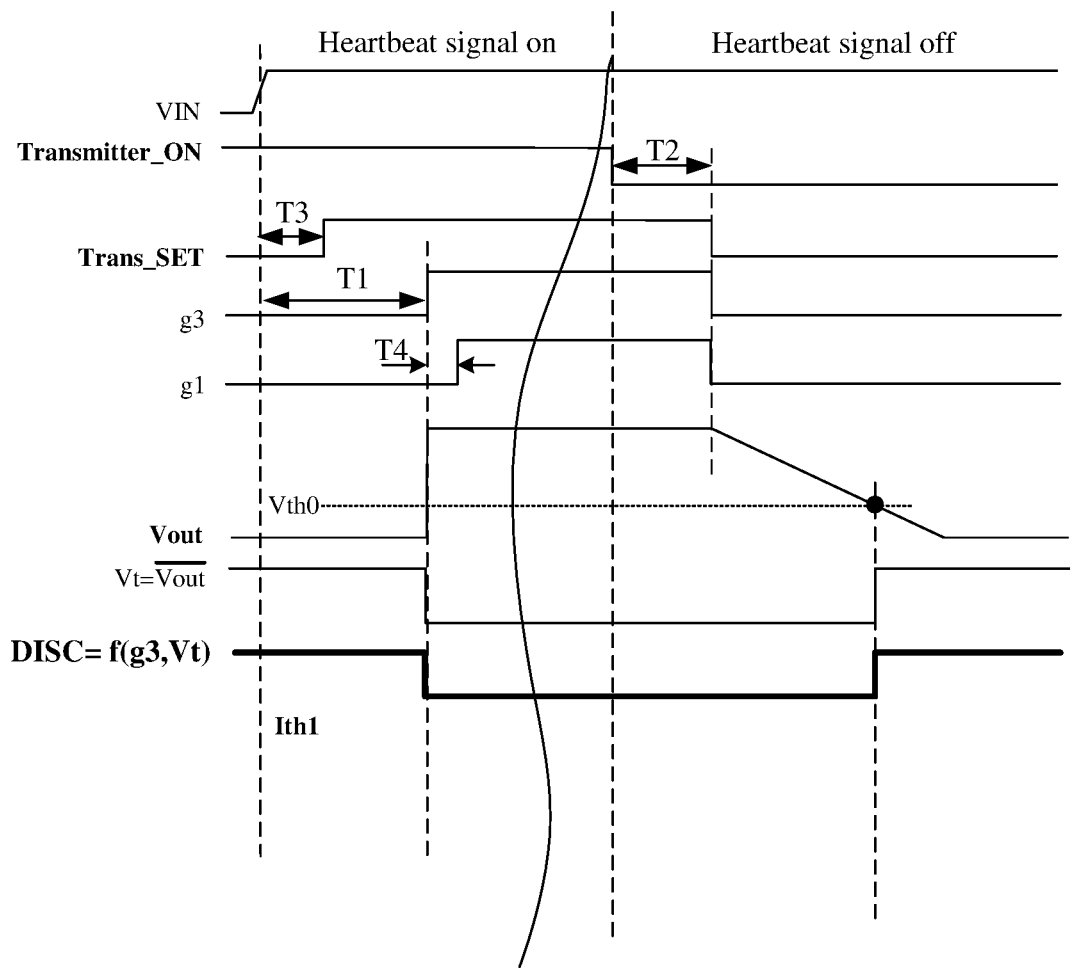
FIG. 5 is a control timing diagram of a release circuit according to an embodiment of the present disclosure.

Specifically, reference is made to FIG. 5. FIG. 5 is a control timing diagram of a release circuit according to an embodiment of the present disclosure. Vout is the bus voltage, and Vth0 is the preset voltage. After the shutdown device, namely, the two main switching transistors, are turned off, the bus voltage on the bus is usually greater than the preset voltage. In this case, the bus first consume the bus voltage on its own. Then, the release circuit is controlled to be turned on when the bus voltage is less than Vth0. From FIG. 5, it can be concluded that, in the present disclosure the logic of the control of the release circuit is determined by the control signal (g3) corresponding to the first turned on main switching transistor (M3) and the feedback signal (Vt) of the bus voltage.

In summary, in the embodiments of the present disclosure, while ensuring that the voltage on the bus is released as soon as possible by using the release circuit, it further ensures the safety of the release circuit, that is, ensuring that the release circuit is not damaged.

In an embodiment, the release circuit includes a switching circuit. A first terminal of the switching circuit is connected to the bus, a second terminal of the switching circuit is grounded, and a control terminal of the switching circuit is the control terminal of the release circuit.

The controlling the release circuit to be turned on to release the voltage on the bus includes:

controlling to conduct the first terminal of the switching circuit and the second terminal of the switching circuit to release the voltage on the bus.

Specifically, a specific implementation method for the release circuit is provided according to the embodiment of the present disclosure. The release circuit may be, but not limited to the switching circuit. A turn-on state or a turn-off state of the release circuit is controlled by turn-on state or a turn-off state of the switching circuit. Specifically, when conducting between the first and second terminals of the switching circuit, the release circuit is in the turn-on state, and the bus is connected to the ground through the switch circuit, thereby releasing the voltage on the bus to the ground to quickly reduce the voltage on the bus, and avoiding the occurrence of the direct current high voltage on the bus. When the cut-off occurs between the first and second terminals of the switching circuit, the release circuit is in the turn-off state.

Of course, the specific implementation method of the release circuit may be, but is not limited to, the switching circuit, or other circuits that quickly reduce the voltage on the bus, which is not specifically limited in the present disclosure.

Figure 6:
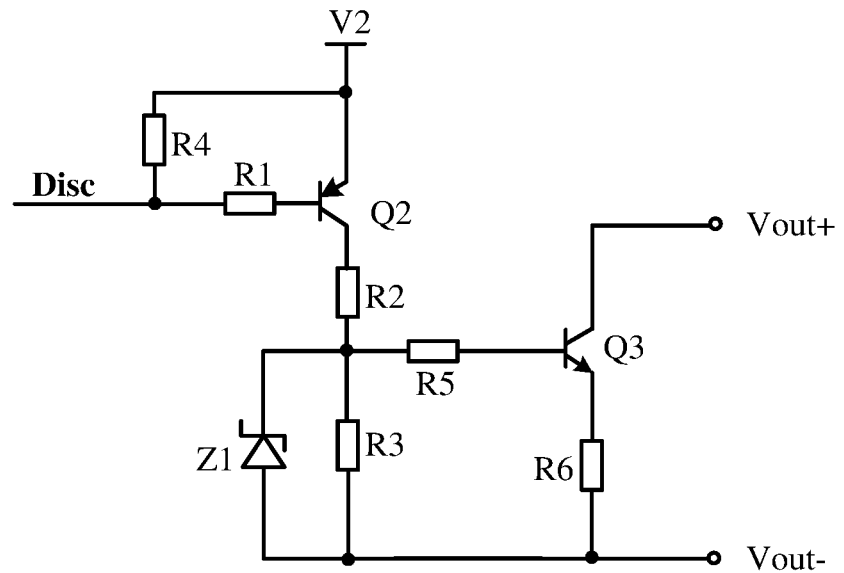
FIG. 6 is a schematic circuit diagram of a release circuit according to an embodiment of the present disclosure.

Reference is made to FIG. 6, which is a schematic circuit diagram of a release circuit according to an embodiment of the present disclosure.

In an embodiment, the release circuit includes a second controllable switch Q2, and a third controllable switch Q3. A control terminal of the second controllable switch Q2 is the control terminal of the release circuit, a first terminal of the second controllable switch Q2 is connected to a power module, and a second terminal of the second controllable switch Q2 is connected to a control terminal of the third controllable switch Q3. A first terminal of the third controllable switch Q3 is connected to the bus, and a second terminal of the third controllable switch Q3 is grounded.

A specific implementation method for the release circuit is provided according to the embodiment of the present disclosure. When controlling the release circuit to be turned on, the outputted control signal enables the conduction between the first and second terminals of the third controllable switch Q3.

Specifically, the second controllable switch Q2 may be, but not limited to a PNP (positive-negative-positive) transistor, and the third controllable switch Q3 may be, but not limited to an NPN (negative-positive-negative) transistor.

In an embodiment, the release circuit also includes a first resistor, a second resistor, a third resistor, a fourth resistor, a fifth resistor, a sixth resistor and a voltage-regular transistor.

A first terminal of the first resistor is connected to a first terminal of the fourth resistor and serves as the control terminal of the switching circuit. A second terminal of the first resistor is connected to the control terminal of the second controllable switch Q2. A second terminal of the fourth resistor is connected to the first terminal of the second controllable switch Q2. A first terminal of the second resistor is connected to the second terminal of the second controllable switch Q2. A second terminal of the second resistor is connected to a first terminal of the voltage-regulator transistor, a first terminal of the third resistor and a first terminal of the fifth resistor, respectively. A second terminal of the third resistor is connected to a second terminal of the voltage-regulator transistor, a first terminal of the sixth resistor and the ground, respectively. A second terminal of the fifth resistor is connected to the control terminal of the third controllable switch Q3. A second terminal of the sixth resistor is connected to the second terminal of the third controllable switch Q3.

The voltage-regulator transistor is used to ensure a stable control voltage for the control terminal of the third controllable switch Q3. A base voltage of the third controllable switch Q3 is increased by the resistance of the sixth resistor, and then a stable control of the constant current source is realized. Therefore, the problem that the temperature affects the magnification of the third controllable switch Q3 and Ube on the release current is solved.

Figure 7:
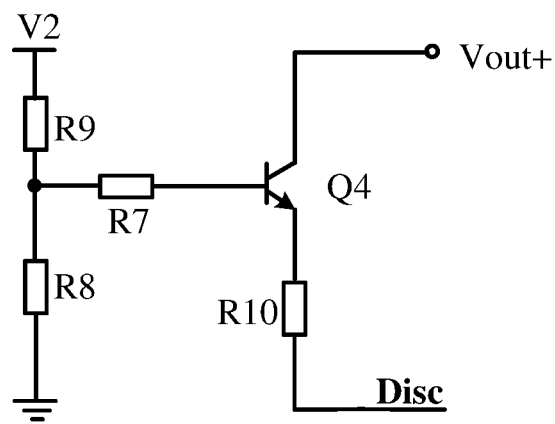
FIG. 7 is a schematic circuit diagram of a release circuit according to another embodiment of the present disclosure.

Reference is made to FIG. 7, which is a schematic circuit diagram of a release circuit according to another embodiment of the present disclosure.

In an embodiment, N is equal to 1, and the release circuit includes a reference voltage module and a fourth controllable switch Q4. A output terminal of the reference voltage module is connected to a control terminal of the fourth controllable switch Q4, a first terminal of the fourth controllable switch Q4 is connected to the bus, and a second terminal of the fourth controllable switch Q4 is connected to the ground terminal of the processor.

The fourth controllable switch Q4 may be, but not limited to a PNP transistor. The reference voltage module may, but not limited to, include an eighth resistor and a ninth resistor. A first terminal of the eighth resistor is grounded, a second terminal of the eighth resistor is connected to a first terminal of the ninth resistor and serves as the output terminal of the reference voltage module. A second terminal of the ninth resistor is connected to an output terminal of the power module. The output terminal of the power module may be, but not limited to, the first terminal of the second capacitor.

When N is equal to 1, the release circuit further includes a seventh resistor and a tenth resistor. A first terminal of the seventh resistor is connected to the output terminal of the reference voltage module, and a second terminal of the seventh resistor is connected to the control terminal of the fourth controllable switch Q4. The tenth resistor is connected between the input terminal of the fourth controllable switch Q4 the ground terminal of the processor. The function of the tenth resistor is the same as that of the sixth resistor in the corresponding circuit.

In summary, in this embodiment, when the switching circuit is in the turn-on state, the switching circuit can quickly connect the bus to the ground, so as to quickly reduce the voltage on the bus, thereby achieving the function of the release circuit mentioned above. In addition, the implementation method is simple and reliable.

In an embodiment, a positive terminal of a power supply of the processor is connected to an output positive terminal of a first photovoltaic module, and a negative terminal of the power supply of the processor is connected to the output negative terminal of the i-th photovoltaic module.

The shutdown device further includes N bypass switching transistors corresponding to the N photovoltaic modules one by one. A first terminal of each bypass switching transistor is connected to a second terminal of a corresponding main switching transistor, and a second terminal of said bypass switching transistor is connected to an output negative terminal of a corresponding photovoltaic module.

The bypass switching transistor is a Metal-Oxide-Semiconductor Field-Effect Transistor, MOSFET, and the MOSFET includes a body diode.

After the controlling the N main switching transistors to be turned on, the method further includes:
  determining whether the supply voltage of the processor is less than an under-voltage protection voltage;
  if the supply voltage is less than the under-voltage protection voltage, controlling the N main switching transistors to be turned off, and determining whether a bypass current of a bypass switching transistor is continuously greater than a preset current during a third preset period; and
  if the bypass current is continuously greater than the preset current during the third preset period, controlling the N bypass switching transistors to be turned on.

Considering that multiple photovoltaic modules are connected in series through the shutoff device to output direct current power, which is then converted into alternating current power by the inverter and integrated into the grid, if one of the shutoff devices fails, all photovoltaic modules are unable to output direct current power to the direct current cable, and the entire photovoltaic system is unable to integrate alternating current power into the grid.

Specifically, the power supply voltage of the processor is the direct current power outputted from the multiple photovoltaic modules in the corresponding photovoltaic module group. After the N main switching transistors are controlled to be turned on, the direct current power outputted from the multiple photovoltaic modules not only supplies power to the processor, but also outputs direct current to the direct current cable through the corresponding main switching transistor. The turning on of N main switching transistors may reduce the power supply voltage of the processor, which may reach the under-voltage protection voltage of the processor, causing abnormal operation of the processor and potentially leading to unreliable control of the shutoff device.

In order to solve the above technical problems, N bypass switching transistors corresponding to the N photovoltaic modules are provided in the present disclosure. In a case that a voltage of a processor of a shutdown device is abnormal, N bypass switching transistors corresponding to said shutdown device is controlled to be turned on, and N main switching transistors are controlled to be turned off, so that the N bypass switching transistors can short-circuit said shutdown device, and the photovoltaic module groups corresponding to other normally functioning shutdown devices can output direct current power to the bus through the N bypass switching transistors, thereby ensuring the normal operation of the photovoltaic system.

Specifically, the control method in this embodiment is to determine whether to turn on a bypass switching transistor by determining the power supply voltage and bypass current of the processor after N main switching transistors are controlled to be turned on.

Specifically, when the supply voltage of the processor is less than its own under-voltage protection voltage, corresponding N switching transistors are controlled to be turned off, and when the current of the bypass switching transistors is greater than the preset current continuously during the third preset period, N corresponding bypass switching transistors are controlled to be turned on, so that the photovoltaic module group composed of N photovoltaic modules can be separated from multiple photovoltaic modules connected in series by the N bypass switching transistors, thereby ensuring that other photovoltaic module groups can output the direct current power to the direct current cable normally, and ensuring the normal operation of the photovoltaic system.

It should be noted that, the determination method in this embodiment is to determine whether the bypass current is continuously greater than the preset current during the third preset period, the purpose of which is to further ensure the reliability of the shutdown device and avoid misoperation caused by an improper determination. In addition, the bypass switching transistors in this embodiment may be but are not limited to MOSFETs. When the MOSFET is not turned on, the bypass current may flow through the body diode in the MOSFET. While when the bypass current is too large, it may cause severe heating of the body diode, which may damage the MOSFET. Therefore, when the bypass current is too large, the bypass switching transistors are controlled to be turned on.

Figure 8:
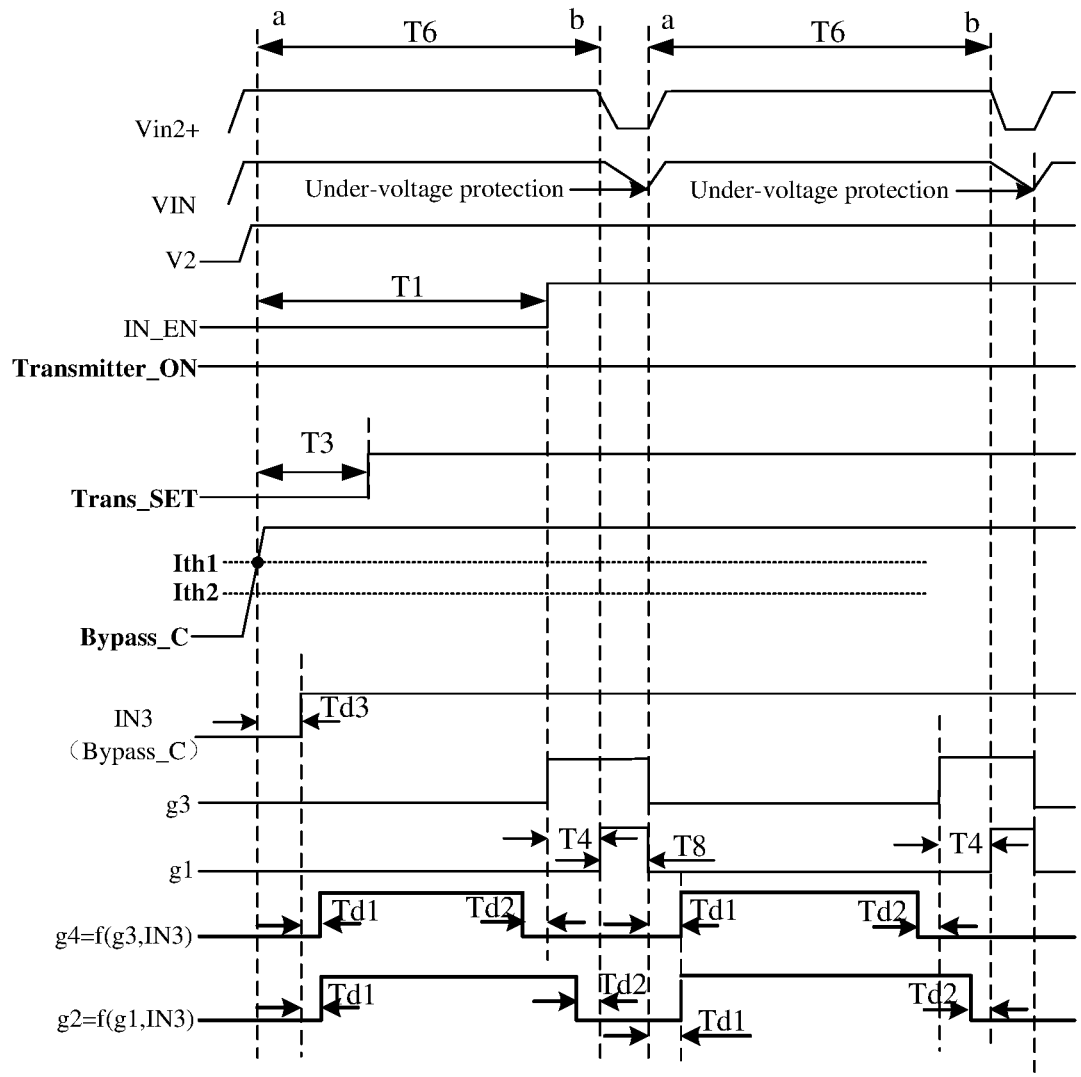
FIG. 8 is a control timing diagram of a shutdown device corresponding to two photovoltaic modules according to another embodiment of the present disclosure.

When N is equal to 2, reference is made to FIG. 8. FIG. 8 is a control timing diagram of a shutdown device corresponding to two photovoltaic modules according to another embodiment of the present disclosure. In FIG. 8, Bypass_C is the bypass current, Ith_1 is the preset current, IN3 is the internal logic signal, and g1, g2, g3 and g4 are control signals of M1, M2, M3 and M4 respectively, where M1, M2, M3 and M4 are turned on when the control signals are in high level. It can be seen from FIG. 8, when the bypass current is greater than the preset current (the third preset period, Td3), IN3 is in high level. If the corresponding main switching transistor is turned off, the corresponding bypass switching transistor is turned on. Specifically, the power level of g4 is determined by the logic of IN3 and g3, and the power level of g2 is determined by the logic of IN3 and g1.

In summary, when the power supply voltage of the shutdown device is abnormal, that is, the supply voltage of the shutdown device is less than its own under-voltage protection voltage, the N bypass switching transistors are controlled to be turned on. Thus, the N photovoltaic modules connected to the shutdown device are separated from the multiple photovoltaic module groups connected in series which are connected to the inverter, so that the photovoltaic module groups corresponding to other shutoff devices can normally output direct current voltage to the inverter, and the inverter can normally output alternating current power for integration into a power grid, thereby improving the reliability of the photovoltaic system.

In an embodiment, after controlling the N bypass switching transistors to be turned on, the method further includes:

determining whether a turning-on period of the N bypass switching transistors reaches a fourth preset period; and
if so, controlling the N bypass switching transistors to be turned off and entering the step of controlling the N main switching transistors to be turned on.

After the controlling bypass switching transistors to be turned on, in order to raise the power supply of the processor to a voltage that can enable the processor to operate normally, and to determine whether the power supply voltage of the processor is recovered to the power supply voltage for normal operation, the method of this embodiment includes: after entering a bypass mode (when the N bypass switching transistors are turned on and the N main switching transistors are turned off) for the fourth preset period, exiting the bypass mode, controlling the main switching transistors to be turned on, and controlling the bypass switching transistors to be turned off. If the processor power supply voltage is normal at this time, the whole shutoff device enters a normal operation mode. Otherwise, the shutoff device enters the bypass mode again. That is, whether to control the shutoff device to exit the bypass mode is determined by an intermittent mode in this embodiment.

In an embodiment, on the basis of controlling N main switching transistors to be turned on by staggering peaks, the controlling the N bypass switching transistors to be turned off includes:

controlling an order of controlling the N bypass switching transistors to be turned off to be the same as an order of controlling the corresponding N main switching transistors to be turned on by staggering peaks.

Specifically, the photovoltaic system may be damaged by the direct pass-through phenomenon. When N main switching transistors are turned on simultaneously, voltage on a bus and current on each main switching transistor will suddenly increase. In this case, it may cause damage to the photovoltaic system due to voltage mutations or current mutations.

In order to solve technical problems above, in the present disclosure, when N main switching transistors are controlled to be turned on, the N main switching transistors are controlled to be turned on by staggering peaks, to enable the voltage or current to increase gradually, thereby avoiding the damage to the photovoltaic system. The time when N main switching transistors are turned on by staggering peaks is not limited in the present disclosure. The N bypass switching transistors are correspondingly controlled to be turned off by staggering peaks.

Specifically, when N is equal to two, one shutoff device corresponds to two photovoltaic modules, two main switching transistors and two bypass switching transistors. In an embodiment of the present disclosure, the main switching transistors and bypass switching transistors are NMOS transistors, as shown in FIG. 3, FIG. 4 and FIG. 8. It can be seen from FIG. 8, when the bypass current is greater than the preset current (the third preset period, Td3), IN3 is in high level. If the corresponding main switching transistor is turned off, the corresponding bypass switching transistor is turned on. Specifically, the power level of g4 is determined by the logic of IN3 and g3, and the power level of g2 is determined by the logic of IN3 and g1. Furthermore, it can be seen from FIG. 8 that, M3 is turned on (staggering peak time, T4) earlier than M1, the corresponding bypass switching cube M4 is turned on T4 earlier than M2.

In order to maintain the power supply voltage VIN of the processor, and keep the control of g1 for a period of T8 time, g1 is controlled to be in a low level to turn off M1, causing the input voltage Vin 2+ to rise, the startup process being restart and the bypass switching transistor being turned on, in which the delay period of T8 time is configured due to the consideration that the VIN voltage drops to the under-voltage protection voltage of the processor when M1 is turned on.

When the intermittent start mode is used, the bypass switching transistors are turned off in a staggered manner, the time when the bypass switching transistors are turned off is relatively Td2 hours earlier than the time when the corresponding main switching transistors are turned on next time, or other times, which is not specifically limited in the present disclosure.

In summary, it can be detected whether the processor has resumed normal operation according the embodiment of the present disclosure. When the processor operates normally, the photovoltaic module group corresponding to the shutoff device is controlled to output direct current, and when the processor is still abnormal, the photovoltaic module group corresponding to the shutoff device is controlled to be entered the bypass mode.

In an embodiment, after the determining whether the power supply voltage of the processor is less than the under-voltage protection voltage, the method further includes:

if the power supply voltage of the processor is not less than the under-voltage protection voltage, obtaining operation information of the N photovoltaic modules;
based on the operation information, determining whether there is a photovoltaic module with abnormal operation in the N photovoltaic modules; and
if there is the photovoltaic module with abnormal operation, controlling a main switching transistor corresponding to the photovoltaic module with abnormal operation to be turned off, and controlling a bypass switching transistor corresponding to the photovoltaic module with abnormal operation to be turned on.

There may be short boards such as obstructions in the photovoltaic modules corresponding to the shutoff device, which may cause abnormal voltage and current output of the module, thereby affecting the operation of the entire photovoltaic system.

In order to solve the technical problems above, in the present disclosure, when the photovoltaic module output direct current to the bus through the corresponding main switching transistor, the operation information of each photovoltaic module is obtained. Whether the corresponding photovoltaic module is abnormal is determined according to the operation information. If the corresponding photovoltaic module is abnormal, the corresponding bypass switching transistor is controlled to be turned on, to short circuit the abnormal photovoltaic module and the abnormal main switching transistor. Thus, the abnormal photovoltaic module and the abnormal main switching transistor are separated from the photovoltaic module group corresponding to the shutoff device, so that other photovoltaic modules in the photovoltaic module group can output direct current normally through the turning-on bypass switching transistor.

Specifically, obtaining the operation information of the photovoltaic module may, but is not limited to, include obtaining the output voltage and/or operating current of the photovoltaic module. The output voltage is within a preset voltage range and/or the output current is within a preset current range, it indicates that the corresponding photovoltaic module operates normally. The output voltage and/or the output current are not within the corresponding preset range, it indicates that the corresponding photovoltaic module is abnormal.

In summary, the abnormal photovoltaic module can be separated from the photovoltaic module group corresponding to the shutoff device according to the abovementioned methods, so that other photovoltaic modules in the photovoltaic module group can normally output voltage to the direct current bus, thereby ensuring the normal operation of the photovoltaic system.

In an embodiment, the shutdown device further includes a first controllable switch Q1. A control terminal of the first controllable switch Q1 is connected to the second output terminal of the processor, a first terminal of the first controllable switch Q1 is connected to the output terminal of the power supply of the processor, and a second terminal of the first controllable switch Q1 is connected to a low-voltage device of the shutdown device.

After controlling N main switching transistors to be turned off, the method further includes:

controlling to conduct the first terminal of the first controllable switch and the second terminal of the first controllable switch, to enable the processor to supply power to the low-voltage device through the first controllable switch.

Considering that when the shutdown device is in the turn-off state, there may also be electrical devices that require power supply, such as those that require detection. In this case, the control processor converts its own power supply voltage to output voltage to supply power to other electrical devices, thereby ensuring the normal operation of the system.

Figure 9:
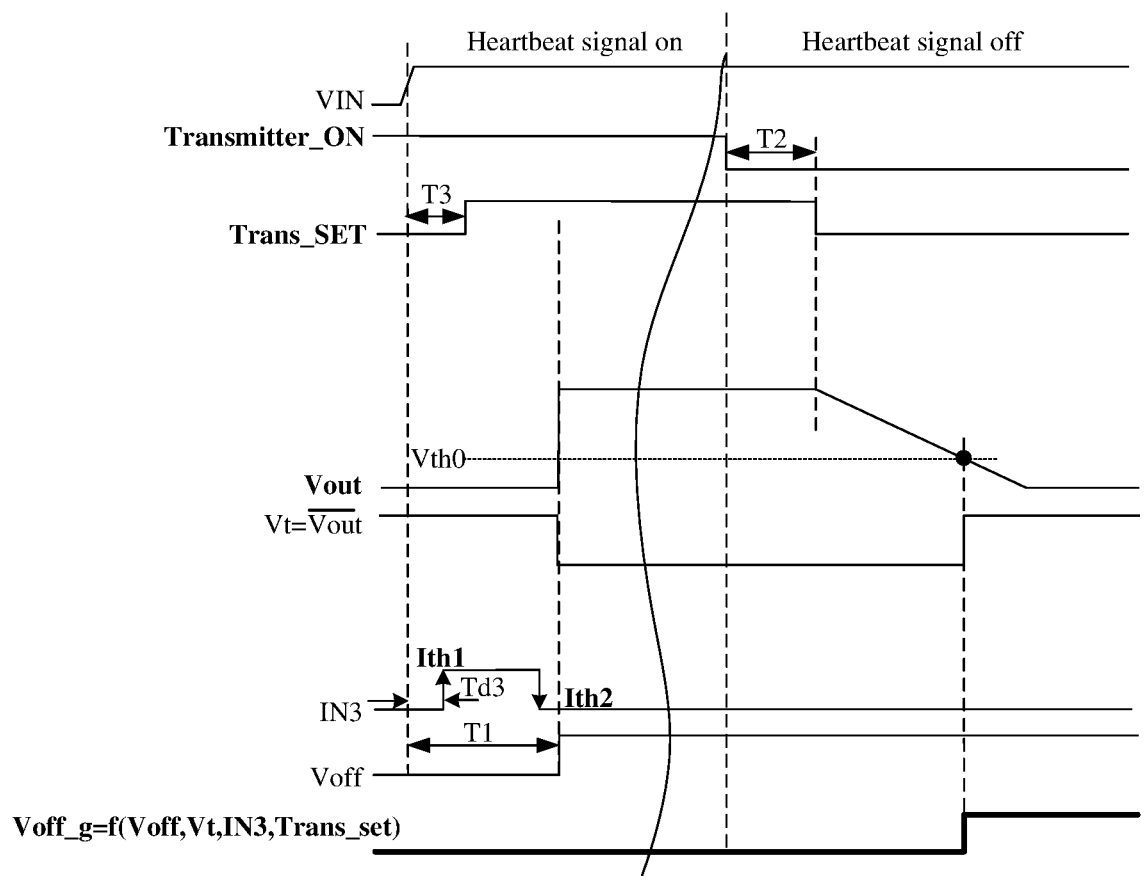
FIG. 9 is a control timing diagram of a first controllable switch according to an embodiment of the present disclosure.

Specifically, reference is made to FIG. 3 and FIG. 9. FIG. 9 is a control timing diagram of a first controllable switch according to an embodiment of the present disclosure. Voff_g is a control signal of the first controllable switch Q1. Specifically, the first controllable switch Q1 is a switch that is controlled by a high level to conduct (such as NMOS, etc.). That is, when Voff_G is at a high level, the first controllable switch Q1 is turned on, and Vout outputs the voltage Voff. When Voff_g is at a low level, the first controllable switch Q1 is controlled to be turned off. FIG. 9 shows that the logic of Voff_g is controlled by the combination logic of Voff, Vt, IN3, and Trans_Set. When the main switching transistor is turned off and Voff needs to be output, Voff_G is at the high level, which can reduce the power consumption of the shutdown device and avoid damage.

In an embodiment, the main switching transistor is a MOSFET, and the MOSFET includes a body diode.

After the controlling the N main switching transistors to be turned on, the method further includes:

obtaining a reverse current of each of the N main switching transistors;
determining whether said reverse current is greater than a preset reverse current; and
if so, controlling a corresponding main switching transistors of which said reverse current is greater than the preset reverse current to be turned on, to backflow said reverse current to a corresponding photovoltaic module through the corresponding main switching transistor.

Considering that photovoltaic module groups in the entire power supply system may be connected in parallel, and thus, the output terminals of multiple shutdown devices may be connected in parallel. If the photovoltaic system is mismatched (for example, the output voltages of the parallel photovoltaic module groups are different), the photovoltaic module groups with the high output voltage may reverse the current to the photovoltaic module groups with the low output voltage. When the main switching transistor is the MOSFET, if the main switching transistor is turned off, the reverse current will charge the low-voltage photovoltaic module through the body diode of the MOSFET, resulting in power consumption and heat generation. If the reverse current is large, the corresponding MOSFET is prone to damage.

To solve the above technical problems, in the present disclosure, the main switching MOSFET is controlled to be turned on when the reverse current is relatively high, that is, the reverse current is greater than the preset reverse current, so that the reverse current is input to the photovoltaic module through the MOSFET, which can reduce the power consumption of the MOSFET and improve the ability to prevent the reverse current.

Figure 10:
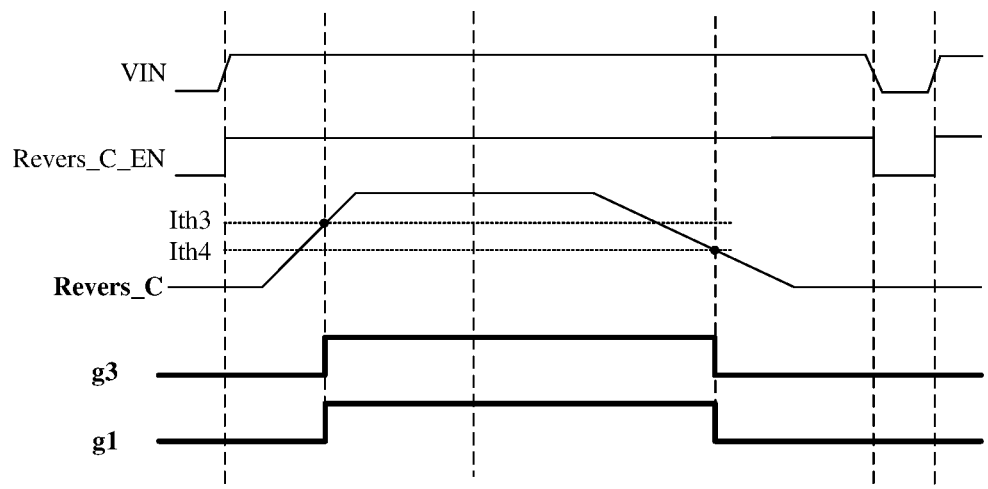
FIG. 10 is a control timing diagram of a reverse current according to an embodiment of the present disclosure.

Specifically, reference is made to FIG. 10. FIG. 10 is a control timing diagram of a reverse current according to an embodiment of the present disclosure. In FIG. 10, a monostable design is used to control the reverse current logic using Ith3 and Ith4. When the reverse current is increased to a value greater than Ith3, g1 and g3 are converted to high levels and the main switching transistors are turned on. When the reverse current is decreased to a value less than Ith4, g1 and g3 are converted to low levels and the main switching transistors are turned off.

In summary, the above implementation methods can reduce the power consumption of the MOSFET and prevent the MOSFET from being damaged due to severe heating or excessive losses.

In addition, it should be noted that, all the logical controls in the present disclosure can be implemented not only by software algorithms, but also through hardware forms such as AND-OR gate, which is not specially limited in the present disclosure.

Figure 11:
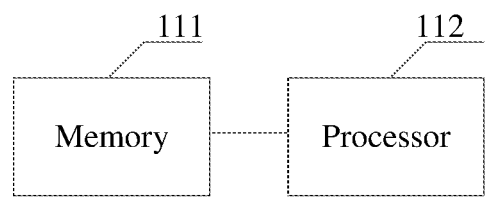
FIG. 11 is a structural diagram of an apparatus for controlling a shutoff device according to an embodiment of the present disclosure.

Reference is made to FIG. 11, FIG. 11 is a structural diagram of an apparatus for controlling a shutoff device according to an embodiment of the present disclosure. The apparatus includes:
  a memory 111, configured to storage computer program; and
  a processor 112, configured to implement any one of the above methods for controlling the shutoff device when executes the computer program.

In order to solve the technical problems above, an apparatus for controlling the shutoff device is further provided according to the present disclosure, the introduction of the apparatus for controlling the shutoff device can refers to the above embodiments, which will not be repeated herein.

A shutoff device is further provided according to embodiment of the present disclosure. The shutoff device includes: the apparatus for controlling the shutoff device described above, N main switching transistors corresponding to the N photovoltaic modules one by one, and a release circuit.

A first terminal of a first main switching transistor is an output positive terminal of the shutdown device, a second terminal of an i-th main switching transistor is connected to an output positive terminal of an i-th photovoltaic module, a first terminal of an (i+1)-th main switching transistor is connected to an output negative terminal of the i-th photovoltaic module, an output negative terminal of a N-th photovoltaic module is an output negative terminal of the shutdown device, a control terminal of the release circuit is connected to a first output terminal of the processor, an input terminal of the release circuit is connected to a bus, and an output terminal of the release circuit is grounded, where N≥i≥1, and N and i are both integers.

The release circuit is configured to release a voltage on the bus after the N main switching transistors are turned off.

In order to solve the technical problems above, a shutoff device is further provided according to the present disclosure, the introduction of the shutoff device provided in the present disclosure can refer to the above embodiments, which will not be repeated herein.

It should be noted that, the relational terms in the present disclosure like first, second and so on, is used to distinguish one entity or operation to another. Therefore, no real relationship or order is required or suggested for the entity or operation. Further, the terms "include", "comprise" or any variant thereof are intended to encompass nonexclusive inclusion so that a process, method, article or device including a series of elements includes not only those elements but also other elements which have not been listed definitely or an element(s) inherent to the process, method, article or device. Unless expressively limited otherwise, a process, method, article or device limited by "comprising/including a(n) . . . " does not exclude existence of another identical element in such process, method, article or device.

Those skilled in the art should further be noted that, units and steps described in the embodiments disclosed herein may be implemented by electronic hardware, computer software or a combination thereof. In order to clearly illustrate interchangeability of the hardware and the software, steps and components in the embodiments have been described generally in terms of functions in the above description. Whether these functions are performed in hardware or software depends on the specific application and design constraints for the technical solution. Those skilled in the art may use different methods for each particular application to implement the described functions, but such implementation should not be considered as going beyond the scope of the present disclosure.

The description of the embodiments herein enables those skilled in the art to implement or use the present disclosure. Various modifications to the embodiments are apparent for the skilled in the art. The general principle defined herein may be implemented in other embodiments without departing from the spirit or scope of the present disclosure. Hence, the present application is not limited to the embodiments disclosed herein, but is to conform to the widest scope in accordance with the principles and novel features disclosed herein.

The invention claimed is:

1. A method for controlling a shutdown device, applied to a processor of the shutdown device,
  wherein the shutoff device comprises N main switching transistors corresponding to N photovoltaic modules one by one and a release circuit;
  wherein a first terminal of a first main switching transistor is an output positive terminal of the shutdown device, a second terminal of an i-th main switching transistor is connected to an output positive terminal of an i-th photovoltaic module, a first terminal of an (i+1)-th main switching transistor is connected to an output negative terminal of the i-th photovoltaic module, an output negative terminal of a N-th photovoltaic module is an output negative terminal of the shutdown device, a control terminal of the release circuit is connected to a first output terminal of the processor, an input terminal of the release circuit is connected to a bus, and an output terminal of the release circuit is grounded, wherein N≥i≥1, and N and i are both integers;
  wherein the method comprises:
  determining whether a heartbeat signal is received continuously during a first preset period;

when determining that the heartbeat signal is received continuously during the first preset period, controlling the N main switching transistors to be turned on, and determining whether the heartbeat signal is not received continuously during a second preset period; and when determining that the heart signal is not received continuously during the second preset period, controlling the N main switching transistors to be turned off, and controlling the release circuit to be turned on to release a voltage on the bus.

2. The method according to claim 1, wherein after the controlling the N main switching transistors to be turned off, the method further comprises:
obtaining a bus voltage on the bus;
determining whether the bus voltage is greater than a preset voltage; and
when determining that the bus voltage is not greater than the preset voltage, proceeding to the step of controlling the release circuit to be turned on to release the voltage on the bus.

3. The method according to claim 1, wherein the release circuit comprises a switching circuit, a first terminal of the switching circuit is connected to the bus, a second terminal of the switching circuit is grounded, and a control terminal of the switching circuit is the control terminal of the release circuit;
wherein the controlling the release circuit to be turned on to release a voltage on the bus comprises:
controlling to conduct the first terminal of the switching circuit and the second terminal of the switching circuit to release the voltage on the bus.

4. The method according to claim 1, wherein a positive terminal of a power supply of the processor is connected to an output positive terminal of a first photovoltaic module, and a negative terminal of the power supply of the processor is connected to the output negative terminal of the i-th photovoltaic module;
wherein the shutdown device further comprises N bypass switching transistors corresponding to the N photovoltaic modules one by one, a first terminal of each bypass switching transistor is connected to a second terminal of a corresponding main switching transistor, and a second terminal of said bypass switching transistor is connected to an output negative terminal of a corresponding photovoltaic module;
wherein each of the N bypass switching transistors is a Metal-Oxide-Semiconductor Field-Effect Transistor, MOSFET, and the MOSFET comprises a body diode; and
wherein after the controlling the N main switching transistors to be turned on, the method further comprises:
determining whether a supply voltage of the processor is less than an under-voltage protection voltage;
when determining that the supply voltage is less than the under-voltage protection voltage, controlling the N main switching transistors to be turned off, and determining whether a bypass current of a bypass switching transistor is continuously greater than a preset current during a third preset period; and
controlling the N bypass switching transistors to be turned on when determining that the bypass current is continuously greater than the preset current during the third preset period.

5. The method according to claim 4, wherein after the controlling the N bypass switching transistors to be turned on, the method further comprises:

determining whether a turning-on period of the N bypass switching transistors reaches a fourth preset period; and
controlling the N bypass switching transistors to be turned off and proceeding to the step of controlling the N main switching transistors to be turned on, when determining that the turning-on period reaches the fourth preset period.

6. The method according to claim 4, wherein after the determining whether a supply voltage of the processor is less than an under-voltage protection voltage, the method further comprises:
obtaining operating information of the N photovoltaic modules when determining that the supply voltage of the processor is not less than the under-voltage protection voltage;
determining whether there is a photovoltaic module with abnormal operation in the N photovoltaic modules based on the operation information; and
controlling a main switching transistor corresponding to the photovoltaic module with abnormal operation to be turned off and controlling a bypass switching transistor corresponding to the photovoltaic module with abnormal operation to be turned on, when determining that there is the photovoltaic module with abnormal operation.

7. The method according to claim 1, wherein the shutdown device further comprises a first controllable switch, a control terminal of the first controllable switch is connected to a second output terminal of the processor, a first terminal of the first controllable switch is connected to an output terminal of a power supply of the processor, and a second terminal of the first controllable switch is connected to a low-voltage device of the shutdown device;
wherein after the controlling the N main switching transistors to be turned off, the method further comprises:
controlling to conduct the first terminal of the first controllable switch and the second terminal of the first controllable switch, to enable the processor to supply power to the low-voltage device through the first controllable switch.

8. The method according to claim 1, wherein each of the N main switching transistors is a Metal-Oxide-Semiconductor Field-Effect Transistor, MOSFET, and the MOSFET comprises a body diode;
wherein after the controlling the N main switching transistors to be turned on, the method further comprises:
obtaining a reverse current of each of the N main switching transistors;
determining whether said reverse current is greater than a preset reverse current; and
when determining that said reverse current is greater than the preset reverse current, controlling a corresponding main switching transistors of which said reverse current is greater than the preset reverse current to be turned on, to backflow said reverse current to a corresponding photovoltaic module through the corresponding main switching transistor.

9. A control apparatus of a shutdown device, comprising:
a memory, configure to store computer program;
a processor, configured to implement a method for controlling a shutoff device when executes the computer program;
wherein the method is applied to a processor of the shutdown device;
wherein the shutoff device comprises N main switching transistors corresponding to N photovoltaic modules one by one and a release circuit;

wherein a first terminal of a first main switching transistor is an output positive terminal of the shutdown device, a second terminal of an i-th main switching transistor is connected to an output positive terminal of an i-th photovoltaic module, a first terminal of an (i+1)-th main switching transistor is connected to an output negative terminal of the i-th photovoltaic module, an output negative terminal of a N-th photovoltaic module is an output negative terminal of the shutdown device, a control terminal of the release circuit is connected to a first output terminal of the processor, an input terminal of the release circuit is connected to a bus, and an output terminal of the release circuit is grounded, wherein $N \geq i \geq 1$, and N and i are both integers;

wherein the method comprises:

determining whether a heartbeat signal is received continuously during a first preset period;

when determining that the heartbeat signal is received continuously during the first preset period, controlling the N main switching transistors to be turned on, and determining whether the heartbeat signal is not received continuously during a second preset period; and when determining that the heart signal is not received continuously during the second preset period, controlling the N main switching transistors to be turned off, and controlling the release circuit to be turned on to release a voltage on the bus.

10. A shutdown device, comprising:

the apparatus for controlling the shutoff device according to claim 9.

11. The shutdown device according to claim 10, comprising a second controllable switch and a third controllable switch;

wherein a control terminal of the second controllable switch is the control terminal of the release circuit, a first terminal of the second controllable switch is connected to a power supply module, a second terminal of the second controllable switch is connected to a control terminal of the third controllable switch, a first terminal of the third controllable switch is connected to the bus, and a second terminal of the third controllable switch is grounded.

12. The shutdown device according to claim 10, wherein N is equal to one, and the release circuit comprises a reference voltage module and a fourth controllable switch;

wherein an output terminal of the reference voltage module is connected to a control terminal of the fourth controllable switch, a first terminal of the fourth controllable switch is connected to the bus, and a second terminal of the fourth controllable switch is connected to a ground terminal of the processor.

* * * * *